United States Patent Office 3,275,680
Patented Sept. 27, 1966

3,275,680
PRODUCTION OF ORGANIC ACETATES IN PRESENCE OF A NOBLE METAL CATALYST AND OXYGEN
Hermann Holzrichter, Walter Krönig, and Bruno Frenz, Leverkusen, Germany, assignors to Farbenfabriken Bayer Aktiengesellschaft, Leverkusen, Germany, a corporation of Germany
No Drawing. Filed Jan. 23, 1963, Ser. No. 253,279
Claims priority, application Germany, Feb. 3, 1962, F 35,917; Oct. 11, 1962, F 38,011
15 Claims. (Cl. 260—497)

This invention relates to a process for the production of organic acetates, especially vinyl acetate.

The two most important methods of producing vinyl acetate start from acetylene or ethylene. For example, acetic acid can be added to acetylene in the presence of catalysts to form vinyl acetate. Starting from ethylene, acetaldehyde can be obtained by known methods and addition of acetic acid anhydride thereto yields ethylidene diacetate. This can then be split to give vinyl acetate and acetic acid. The method which starts from acetylene is fairly expensive, on account of the relatively high cost of this initial material. The method starting from ethylene and by way of acetaldehyde has the disadvantage of a multi-stage working method. Accordingly, it would be desirable to obtain vinyl acetate from ethylene, which is a relatively inexpensive starting material, in a more simple manner than has hitherto been possible.

It is an object of the present invention to provide a novel process for the production of organic acetates. Another object is to provide a novel process for the production of vinyl acetate. A further object is to provide a new economical process. Still more objects will be apparent from the following description.

We have found that organic acetates are obtained in simple manner if lower monoolefines or lower alkyl benzenes and oxygen are reacted at elevated temperature and in the presence of noble metal catalysts with acetic acid.

The process according to the invention can be explained, taking ethylene as an example, by the following reaction equation:

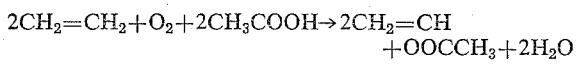

$$2CH_2=CH_2+O_2+2CH_3COOH \rightarrow 2CH_2=CH\ +OOCCH_3+2H_2O$$

In this reaction, acetaldehyde is obtained as a secondary product.

With olefines containing at least 3 carbon atoms the acetic acid does surprisingly not react with the carbon atoms connected by a double bond, but with the carbon atom which is in the $\alpha$-position to the double bond. Thus, propylene for example reacts to form allyl acetate and isobutylene reacts to form methallyl acetate and benzyl acetate can be obtained from toluene. The reactions described are those which occur in quite a predominant manner. Secondary reactions also occur to a certain degree, for example acetone is obtained additionally when using propylene, and tertiary butanol and tertiary butyl acetate are obtained additionally when using i-butene.

With the term lower monolefines there are designated olefines containing up to four carbon atoms, such as ethylene, propylene or i-butylene. With lower alkyl benzenes there is designated the benzene substituted by one or two lower alkyl groups, the alkyl groups having up to four carbon atoms. In these compounds the double bond of the aromatic nucleus reacts in the same manner as the double bond of the monoolefines in the process of the preesnt invention. Examples of these compounds are the toluene, p-xylene or ethyl benzene. The term olefines used hereinafter shall also include these alkyl benzenes. It is expedient to ensure that the materials introduced are as far as possible free from impurities which can react in a similar manner under the reaction conditions as for example acetylenes, diolefines, etc. It is advantageous to use the aliphatic olefines in high concentration, for example ethylene as 99% ethylene, but they can also be used for example diluted with paraffinic hydrocarbons, as they are obtained for example in hydrocarbon streams obtained when working up oil, for example in cracking processes.

The oxygen can be supplied in the form of air. When the reaction components are circulated, however, it is generally more advantageous to work with concentrated oxygen, preferably above 99%. The proportion of oxygen in the olefine-oxygen mixture can for example be 1 to 30 parts by volume, more advantageous 2 to 20 parts by volume; since only a part of the olefines is reacted in a single throughput, it is advisable for the olefines to be recycled after separation from the reaction products.

The acetic acid for the process according to the invention is preferably employed in concentrated form, for example as 90% acid or as glacial acetic acid. It is however also possible to work with lower acetic acid concentration, e.g. of 70%. It is generally very advantageous to dissolve alkali metal acetates in glacial acetic acid. Especially suitable are potassium acetate and lithium acetate. A 0.2-molar to 2-molar solution of the acetates in glacial acetic acid has for example proved expedient. The ratio between the acetic acid and the olefine on entering the reaction chamber can for example be between 1 and 100 and preferably 2 and 20 mols of acetic acid to each mol of olefine. The acetic acid is conveyed in circulation and care is taken that the reaction products dissolved therein are removed, for example by distillation or steam distillation from the acetic acid before it is returned into the reaction chamber. It is advisable to carry out this distillation at approximately normal or slightly raised pressure and to restore the acetic acid to the reaction pressure after distillation. The acetic acid consumed by the process according to the invention is replaced as fresh acetic acid, e.g. glacial acetic acid.

One particularly advantageous form of the process according to the invention is to operate in the trickling phase, in which the acetic acid, together with the olefins which are present in liquid or gaseous form or in a mixed phase, trickles in an oxygen atmosphere over the catalyst fixedly arranged in the reaction chamber. In this case, the glacial acetic acid flows downwardly over the fixedly arranged catalyst and the other reactants (hydrocarbons and oxygen) also move downwardly over the catalyst. The gases, e.g. the oxygen and also the hydrocarbons, where they are gaseous under the reaction conditions (which is for example the case with ethylene) can also be conducted upwardly through the reaction chamber, i.e. in counter-current to the acetic acid. However, the noble metal catalyst can also be distributed for example as a powder in the acetic acid and the mixture of olefine and oxygen can be conducted upwardly through this suspension, it being possible for the acetic acid suspension to be conducted in the same direction as or in opposition to the gases through the reaction chamber.

It is possible to work at temperatures between 50 and 250° C., advantageously 100 to 200° C. The reaction can be carried out at normal pressure, but it is generally more advantageous to work under high pressure, for example at 2 to 200 atm. and advantageously 10 to 50 atm.

Of the noble metal catalysts, palladium has proved to be particularly effective. The palladium is advantageously applied to supports and aluminum oxide has been found very suitable for this purpose. For example, palladium concentrations on the support between 0.1 and 10% by weight and advantageously 0.5 and 5% by weight can be used. As supports, there are preferably employed macroporous elements which, with a water absorption power of at least 10%, have an intrinsic surface of less than 50 m.$^2$/g. and advantageously less than 20 m.$^2$/g. These catalysts are impregnated with an aqueous noble metal salt solution and the noble metal is precipitated on the support by reduction, for example with hydrazine hydrate in alkaline solution. However, it is also possible for the noble metal salts, for example the nitrates, chlorides or organic salts, for example acetates, to be transformed by reduction with hydrogen at higher temperature into the metal. If the catalysts which are used are fixedly arranged in the reaction chamber, it is possible to employ tablets, rolls or balls in a size of 2 to 8 mm., advantageously 3 to 5 mm.

The reaction chamber is preferably subdivided into several tubes, which are surrounded by a cooling liquid for dissipating the heat of reaction set up. Boiling coolants, such as water, are especially suitable. Internal dimensions of the reaction tubes between 25 and 75 mm. and reactor lengths of 12–8 m., advantageously 2 to 6 m., are suitable.

EXAMPLE 1

For the production of the catalyst, a support was used which was produced from aluminum oxide and bentonite in the ratio by weight of 92:8, the support having been formed into 4 mm. rolls and then heat-treated at 1500° C. This support had an absorption capacity of 25% and an intrinsic surface of 10 m.$^2$/g. This support was impregnated with palladium chloride solution. The palladium was then precipitated with alkaline hydrazine hydrate solution in finely distributed form on the support. The palladium content of the prepared catalyst was 4% by weight. 500 cc. of this catalyst were introduced into a tube with an internal diameter of 30 mm. and a length of 1000 mm. A twice-molar potassium acetate solution in glacial acetic acid trickled over this catalyst, fixedly arranged in the reaction chamber, in a quantity of 3 litres per hour. In addition, 20 litres per hour of gas mixture consisting of 80% by volume of ethylene and 20% by volume of oxygen were supplied at the top end of the reactor. The operation was carried out at 100° C. and normal pressure. 90% of the reacted carbon was obtained as vinyl acetate, 2% as acetaldehyde and 8% as carbon dioxide.

EXAMPLE 2

A horizontal autoclave was used, in which 250 cc. of the catalyst mentioned in Example 1 were arranged in a wire gauze. By rotating the wire gauze in the autoclave, the catalyst was alternately in the liquid phase and in the gas phase, i.e. corresponding to a continuous operation in the trickling phase. 200 ml. of a twice-molar potassium acetate solution in glacial acetic acid were introduced into the autoclave, which had a capacity of 700 cc. Equal parts by volume of ethylene and air were forced in to an initial pressure of 80 atm. While rotating the wire gauze, the autoclave was heated to 120° C. and left for 15 minutes at this temperature. 13% of the carbon introduced as ethylene had been reacted and of the reacted carbon, there were obtained:

80% as vinyl acetate
6.6% as acetaldehyde
2.9% as ethyl acetate
10.5% as carbon dioxide

EXAMPLE 3

For the production of the catalyst, a support was used which had been produced from aluminum oxide and bentonite in a ratio of 92:8 by weight, had been formed into 4 mm. rolls and then heat-treated at 1500° C. This support had a water absorption capacity of 25% and an intrinsic surface of 10 m.$^2$/g. This support was impregnated with palladium chloride, and then the palladium was precipitated with alkaline hydrazine hydrate solution in finely divided form on the support. The palladium content of the prepared catalyst was 2% by weight. A horizontal autoclave was used, in which 250 cc. of the catalyst described were arranged in a wire gauze. Upon rotating the wire gauze in the autoclave, the catalyst was alternately in the liquid phase and in the gas phase, corresponding to the continuous operation in the trickling phase. 200 ml. of a molar potassium acetate solution in glacial acetic acid were introduced into the autoclave, which had a capacity of 700 cc. 27.5 g. of propylene were introduced and thereafter air was forced in to a pressure of 46 atm. While rotating the wire gauze, the autoclave was heated to 120° C. and left for 10 minutes at this temperature. 22% of the carbon introduced as propylene had been reacted and of the reacted carbon, there were obtained:

86.7% as allyl acetate
10.0% as acetone
3.3% as carbon dioxide

EXAMPLE 4

Using the same arrangement as in Example 3 and the same catalyst, 200 ml. of a molar potassium acetate solution in glacial acetic acid were introduced into the autoclave. 50 g. of i-butylene were introduced and air was forced in to a pressure of 50 atm. The reaction conditions were the same as in Example 3. 18% of the carbon introduced as i-butylene had been reacted and of the reacted carbon, there were obtained:

57.8% of methallyl acetate
35.1% of tert. butanol
3.7% as tert. butyl acetate
3.4% as carbon dioxide

EXAMPLE 5

The arrangement of Example 3 was used, and also the catalyst indicated therein as well as the glacial acetic acid solution in the quantity referred to. 69 g. of toluene were introduced and air was forced in to a pressure of 50 atm. The reaction conditions were likewise the same as in Examples 3 and 4. 19% of the carbon introduced as toluene had been reacted and of the reacted carbon, there were obtained:

92.6% as benzyl acetate
6.7% of unidentified oxidation products
0.7% as carbon dioxide Similar results are obtained if p-xylene is used instead of toluene. Thereby, p-xylylene glycol diacetate is obtained.

We claim:
1. A process for the production of vinyl acetate which comprises reacting ethylene with oxygen and acetic acid in the presence of at least a catalytic amount of a noble metal at a temperature within the range from about 50–250° C., and recovering the vinyl acetate thus produced.

2. A process according to claim 1, wherein the oxygen is present in an amount of about 1–30 parts by volume based on the mixture thereof with said ethylene.

3. A process according to claim 1, wherein said acetic acid is present in an amount of 1–100 mols of acetic acid per mol of said ethylene.

4. A process according to claim 1, wherein said oxygen is present in an amount of 1–30 parts by volume based on the mixture thereof with said ethylene and said acetic acid is present in an amount of from 1–100 mols of acetic acid per mol of alkene ethylene.

5. A process according to claim 1, which comprises effecting said reaction in the presence of an alkali metal acetate.

6. A process according to claim 1, wherein said catalyst is palladium metal.

7. A process according to claim 1, wherein said metal catalyst is present, applied to a macroporous support having an intrinsic surface below 50 m.$^2$/g.

8. A process according to claim 1, wherein said acetic acid is glacial acetic acid.

9. A process according to claim 1, which comprises recycling any unreacted ethylene.

10. A process according to claim 1, which comprises recycling unreacted acetic acid.

11. A process for the production of vinyl acetate which comprises passing a stream of reactants essentially consisting of oxygen, aqueous acetic acid and ethylene in contact with a noble metal catalyst at a temperature between about 50 and 250° C. and recovering the vinyl acetate thus produced.

12. A process for the production of organic acetates which comprises reacting a member selected from the group consisting of lower alkenes containing from 2 to 4 carbon atoms and lower alkyl benzenes with oxygen and acetic acid in the presence of an alkali metal acetate and at least a catalytic amount of a noble metal at a temperature within the range from about 50 to 250° C. and recovering the organic acetate thus produced.

13. Process according to claim 12 in which said catalyst is palladium metal.

14. Process for the production of vinyl acetate which comprises reacting ethylene with oxygen and acetic acid in the presence of a catalyst formed of palladium metal on a microporous support having an intrinsic surface of less than 50 m.$^2$/g. at a temperature within the range of about 50 to 250° C. and recovering the vinyl acetate thus produced.

15. Process according to claim 14 in which said reaction is effected in the additional presence of an alkali metal acetate.

References Cited by the Examiner

UNITED STATES PATENTS

| | | | |
|---|---|---|---|
| 2,428,590 | 10/1947 | Shokal | 260—497 |
| 2,726,255 | 12/1955 | Walker | 260—497 X |
| 2,739,169 | 3/1956 | Hagemeyer | 260—497 |

FOREIGN PATENTS

| | | |
|---|---|---|
| 470,216 | 12/1950 | Canada. |
| 555,436 | 4/1958 | Canada. |
| 137,511 | 4/1960 | U.S.S.R. |

OTHER REFERENCES

Moiseev, Doklady Akademii Nauk U.S.S.R., vol. 133, pp. 377–380 (1960).

Smidt, Angew. Chim., vol. 71, pp. 176–182, 1959.

Smidt, Chemistry and Industry, Jan. 13, 1962, pp. 54–61.

LORRAINE A. WEINBERGER, *Primary Examiner.*

LEON ZITVER, *Examiner.*

D. P. CLARKE, V. GARNER, *Assistant Examiners.*

UNITED STATES PATENT OFFICE
CERTIFICATE OF CORRECTION

Patent No. 3,275,680

September 27, 1966

Hermann Holzrichter et al.

It is hereby certified that error appears in the above numbered patent requiring correction and that the said Letters Patent should read as corrected below.

Column 1, lines 44 and 45, for that portion of the equation reading "+OOCCH$_3$" read -- -OOCCH$_3$ --; line 60, for "monolefines" read -- monoolefines --; column 2, lines 22 and 23, for "concentration" read -- concentrations --; column 3, line 21, for "12-8 m." read -- 1-8 m. --; line 41, before "gas" insert -- a --; column 4, line 67, for "alkene" read -- said --; column 6, between lines 11 and 12 insert the following reference:

3,190,912   6/1965   Robinson---260-497

Signed and sealed this 1st day of August 1967.

(SEAL)
Attest:

EDWARD M. FLETCHER, JR.
Attesting Officer

EDWARD J. BRENNER
Commissioner of Patents